(12) United States Patent
Huang et al.

(10) Patent No.: US 8,246,037 B2
(45) Date of Patent: Aug. 21, 2012

(54) AUTOMATIC DOCUMENT FEEDER

(75) Inventors: Wen-An Huang, Taipei (TW);
Chao-Min Yang, Taipei (TW);
Wei-Hsun Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/033,427

(22) Filed: Feb. 23, 2011

(65) Prior Publication Data
US 2012/0153564 A1   Jun. 21, 2012

(30) Foreign Application Priority Data

Dec. 20, 2010   (TW) .............................. 99144707 A

(51) Int. Cl.
*B65H 83/00*   (2006.01)
(52) U.S. Cl. ..................... 271/3.14; 271/264; 399/367
(58) Field of Classification Search ............... 271/3.14, 271/4.01, 4.08, 4.1, 9.01, 9.09, 9.13, 264, 271/9.06; 399/367, 393
See application file for complete search history.

(56) References Cited

U.S. PATENT DOCUMENTS

| | | | | |
|---|---|---|---|---|
| 6,152,440 | A * | 11/2000 | Yip et al. | 271/9.11 |
| 7,380,787 | B2 * | 6/2008 | Fukumura | 271/264 |
| 7,410,166 | B2 * | 8/2008 | Mizubata et al. | 271/264 |
| 7,954,803 | B2 * | 6/2011 | Kitagawa et al. | 271/9.01 |
| 2001/0017438 | A1 * | 8/2001 | Takamtsu | 271/3.14 |

* cited by examiner

*Primary Examiner* — Michael McCullough
(74) *Attorney, Agent, or Firm* — Kirton McConkie; Evan R. Witt

(57) ABSTRACT

An automatic document feeder includes a feeder casing, a pressing structure, a guiding notch, plural first guiding ribs and plural second guiding ribs. The pressing structure is disposed on a bottom part of the feeder casing. The guiding notch is formed in the pressing structure. The first guiding ribs are arranged downstream of the guiding notch. The second guiding ribs are arranged beside the first guiding ribs. The height of the first guiding rib is smaller than the height of the second guiding rib. The lower first guiding ribs are used for guiding a thicker paper. The higher second guiding ribs are used for guiding a thinner paper.

10 Claims, 6 Drawing Sheets

FIG.3

AUTOMATIC DOCUMENT FEEDER

FIELD OF THE INVENTION

The present invention relates to an automatic document feeder, and more particularly to an automatic document feeder for feeding papers with different thicknesses.

BACKGROUND OF THE INVENTION

In the early stage, a scanning apparatus is used to scan the image of a single paper. After the image of the paper has been scanned, the document should be removed from the scanning apparatus and then a next paper may be supported on the scanning apparatus in order to be further scanned. Since the process of manually replacing the paper is very troublesome, the conventional scanning apparatus is not feasible to scan a stack of papers. Recently, an automatic document feeder is integrated into the scanning apparatus. After a stack of papers to be scanned are supported on the input tray of the automatic document feeder, the automatic document feeder will successively transport the papers to perform a scanning operation without the need of manually replacing the papers. This means of automatically feeding the papers is both time-saving and efficient. In addition, the automatic document feeder is also feasible to perform a duplex scanning operation.

Generally, the paper feeding channel within the conventional automatic document feeder is specially designed. The height of the paper feeding channel is highly related to the friction force acting on the to-be-fed paper. As known, by elaborately determining the height of the paper feeding channel, the friction force acting on the to-be-fed paper is adjustable. In a case that a conventional automatic document feeder specially designed for feeding an ordinary paper with an ordinary thickness is used, when the ordinary paper is moved through the paper feeding channel, the friction force acting on the ordinary paper may allow the paper to be smoothly transported through the scanning region of the flatbed scanner in order to achieve good scanning quality. However, a thicker paper with a thickness greater than the ordinary thickness is difficultly transported through the paper feeding channel. Even if the thicker paper can be transported through the paper feeding channel, there are still some drawbacks. For example, since the friction force acting on the thicker paper is greater than the friction force acting on the ordinary, the scanning quality is deteriorated.

For solving these drawbacks, an automatic document feeder capable of adjusting the height of the paper feeding channel has been disclosed. FIG. 1 is a schematic side view illustrating a conventional automatic document feeder with a channel-height adjustable structure. As shown in FIG. 1, an automatic document feeder 10 is integrated into a flatbed scanner 11, and thus the automatic document feeder 10 and the flatbed scanner 11 collectively define an automatic sheet-fed scanning apparatus 1. The automatic document feeder 10 comprises a feeder casing 101, an input tray 102, a pick-up roller assembly 103, a paper feeding channel 104, plural transfer roller assemblies 105, a channel adjusting module 106, a paper ejecting roller assembly 107 and an output tray 108. The flatbed scanner 11 comprises a scanner casing 111, a scanning platform 112 and a scanning module 113. The configurations and the functions of the flatbed scanner 11 are well known to those in the art, and are not redundantly described herein.

In the automatic document feeder 10, the input tray 102 is disposed on the feeder casing 101 for supporting a first paper P1 or a second paper P2. The first paper P1 has a first thickness T1. The second paper P2 has a second thickness T2. The second thickness T2 is greater than the first thickness T1. For example, the first thickness T1 of the first paper P1 is 0.15 mm, and the second thickness T2 of the second paper P2 is 0.3 mm. The pick-up roller assembly 103 is disposed beside the input tray 102 for feeding the first paper P1 or the second paper P2 that is supported on the input tray 102 into the paper feeding channel 104. The paper feeding channel 104 is disposed within the feeder casing 101. The first paper P1 or the second paper P2 may be transported through the paper feeding channel 104. As shown in FIG. 1, the paper feeding channel 104 has a first channel height H1. The plural transfer roller assemblies 105 are arranged in the paper feeding channel 104 for transporting the first paper P1 or the second paper P2. The paper ejecting roller assembly 107 is used for ejecting the first paper P1 or the second paper P2 to the output tray 108. The output tray 108 is used for supporting the first paper P1 or the second paper P2.

The channel adjusting module 106 is disposed within the feeder casing 101 for adjusting the channel height of the paper feeding channel 104. The channel adjusting module 106 comprises a channel adjusting roller 1061, a moving mechanism 1062 and a rotating mechanism 1063. The channel adjusting roller 1061 is used for contacting with the first paper P1 or the second paper P2, thereby transporting the first paper P1 or the second paper P2 through the paper feeding channel 104. The moving mechanism 1062 is connected with the channel adjusting roller 1061 for moving the channel adjusting roller 1061 upwardly or downwardly with respect to the paper feeding channel 104, thereby changing the channel height of the paper feeding channel 104. The rotating mechanism 1063 is connected with the channel adjusting roller 1061 for driving rotation of the channel adjusting roller 1061.1

Please refer to FIG. 1 again. For feeding the first paper P1 by the automatic document feeder 10, the first paper P1 supported on the input tray 102 is transported by the pick-up roller assembly 103 to be fed into the paper feeding channel 104. After the first paper P1 is fed into the paper feeding channel 104, the first paper P1 is transported by the plural transfer roller assemblies 105, so that the first paper P1 is moved in the paper feeding channel 104. When the first paper P1 is moved across the region over the scanning platform 112 and the scanning module 113, the first channel height H1 of the paper feeding channel 104 allows the first paper P1 to be smoothly scanned by the scanning module 113. Afterwards, the first paper P1 is transported to the output tray 108 by the transfer roller assemblies 105 and the paper ejecting roller assembly 107. Meanwhile, the task of scanning the first paper P1 is completed.

Whereas, for feeding the thicker second paper P2 by the automatic document feeder 10, the channel adjusting roller 1061 is moved by the moving mechanism 1062 of the channel adjusting module 106, so that the channel adjusting roller 1061 is moved upwardly with respect to the paper feeding channel 104. Under this circumstance, the channel height of the paper feeding channel 104 is changed to a second channel height H2, wherein the second channel height H2 is greater than the first channel height H1 (see FIG. 2). In such way, when the second paper P2 is transported through the paper feeding channel 104, the friction force acting on the second paper P2 may allow the second paper P2 to be smoothly scanned in order to achieve good scanning quality. The transporting process of the second paper P2 is similar to that of the first paper P1, and is not redundantly described herein.

Although the channel height of the paper feeding channel 104 of the conventional automatic document feeder 10 may be adjusted by the channel adjusting module 106, there are still some drawbacks. For example, since the moving mechanism 1062 of the channel adjusting module 106 occupies the space within the feeder casing 101, it is difficult to further reduce the volume of the automatic document feeder 10. Moreover, since the moving mechanism 1062 should be connected with a driving device (e.g. a motor), the loading of the automatic document feeder 10 is increased.

SUMMARY OF THE INVENTION

The present invention provides an automatic document feeder for feeding papers of various thicknesses without increasing the loading.

In accordance with an aspect of the present invention, there is provided an automatic document feeder. The automatic document feeder is disposed on a scanning platform for feeding a first paper or a second paper. The thickness of the first paper is smaller than the thickness of the second paper. The automatic document feeder includes a feeder casing, a paper feeding channel, a pressing structure, a guiding notch, plural first guiding ribs and plural second guiding ribs. The feeder casing has a bottom part in contact with the scanning platform. The paper feeding channel is disposed within the feeder casing and passes through a region between the bottom part of the feeder casing and the scanning platform. The pressing structure is disposed on the bottom part of the feeder casing for pressing the first paper or the second paper. The guiding notch is formed in the pressing structure for guiding the second paper to be moved through the paper feeding channel. The first guiding ribs are arranged downstream of the guiding notch for guiding the second paper to be moved through the paper feeding channel. The second guiding ribs are arranged beside the first guiding ribs for guiding the first paper to be moved through the paper feeding channel. The height of the first guiding rib is smaller than the height of the second guiding rib.

In an embodiment, the automatic document feeder further includes a driven roller and a first perforation. The driven roller is disposed on the bottom part of the feeder casing and exposed outside the pressing structure for assisting in transporting the first paper or the second paper. The first perforation is formed in the pressing structure and arranged at a side of the guiding notch, wherein the driven roller is penetrated through the first perforation, so that the driven roller is exposed outside the pressing structure.

In an embodiment, the automatic document feeder further includes an elastic element for providing an elastic force to the driven roller. A first terminal of the elastic element is connected with the bottom part of the feeder casing. A second terminal of the elastic element is connected with the driven roller.

In an embodiment, the guiding notch further includes a notch bottom surface. The distance between the notch bottom surface and the scanning platform is greater than the distance between a surface of the pressing structure and the scanning platform. During the first paper is moved through the bottom part of the feeder casing, the first paper is contacted with the driven roller and the surface of the pressing structure. Whereas, during the second paper is moved through the bottom part of the feeder casing, the second paper is contacted with the notch bottom surface.

In an embodiment, the guiding notch further includes a notch bottom surface. The distance between the notch bottom surface and the scanning platform is greater than the distance between a surface of the pressing structure and the scanning platform. During the first paper is moved through the bottom part of the feeder casing, the first paper is contacted with the surface of the pressing structure. Wherein, during the second paper is moved through the bottom part of the feeder casing, the second paper is contacted with the notch bottom surface.

In an embodiment, the automatic document feeder further includes a second perforation and a transmission roller. The second perforation is arranged downstream of the first guiding ribs. The transmission roller is penetrated through the second perforation for transporting the first paper or the second paper.

In an embodiment, the automatic document feeder further includes a transmission shaft, which is sheathed by the transmission roller for driving rotation of the transmission roller.

In an embodiment, the automatic document feeder further includes a first input tray, a second input tray, a first pick-up roller assembly, a second pick-up roller assembly, an output tray, plural transfer roller assemblies and a paper ejecting roller assembly. The first input tray is disposed on the feeder casing for supporting the first paper. The second input tray is disposed on the feeder casing and arranged at a side of the feeder casing for supporting the second paper. The first pick-up roller assembly is disposed beside the first input tray for feeding the first paper that is supported on the first input tray into the paper feeding channel. The second pick-up roller assembly is disposed beside the second input tray for feeding the second paper that is supported on the second input tray into the paper feeding channel. The output tray is disposed under the first input tray for supporting first paper or the second paper that is exited from the paper feeding channel. The transfer roller assemblies are disposed in the paper feeding channel for transporting the first paper or the second paper through the paper feeding channel. The paper ejecting roller assembly is disposed beside the output tray for transporting the first paper or the second paper to the output tray.

In an embodiment, the plural second guiding ribs are arranged at bilateral sides of the plural first guiding ribs, and the plural second guiding ribs and the plural first guiding ribs are parallel with each other.

In an embodiment, the first paper is an A4-sized paper, the second paper is a business card, and the width of the guiding notch is greater than or equal to the width of the second paper.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3 is a schematic side view illustrating an automatic document feeder according to an embodiment of the present invention;

DETAILED DESCRIPTION OF THE PREFERRED EMBODIMENT

Figure 1:
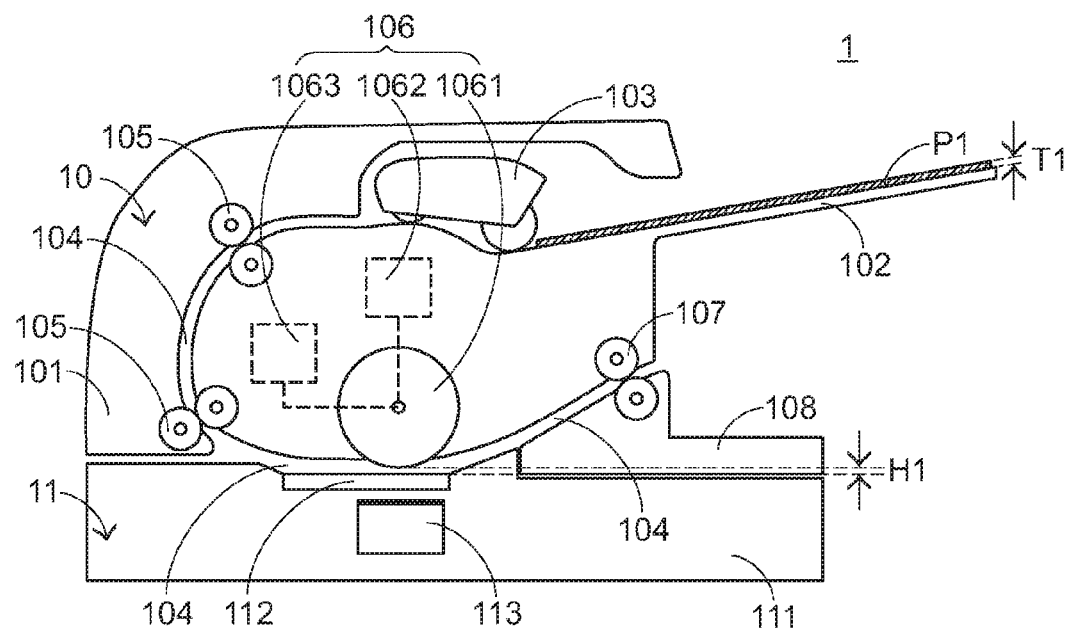
FIG. 1 is a schematic side view illustrating a conventional automatic document feeder with a channel-height adjustable structure.
Figure 2:
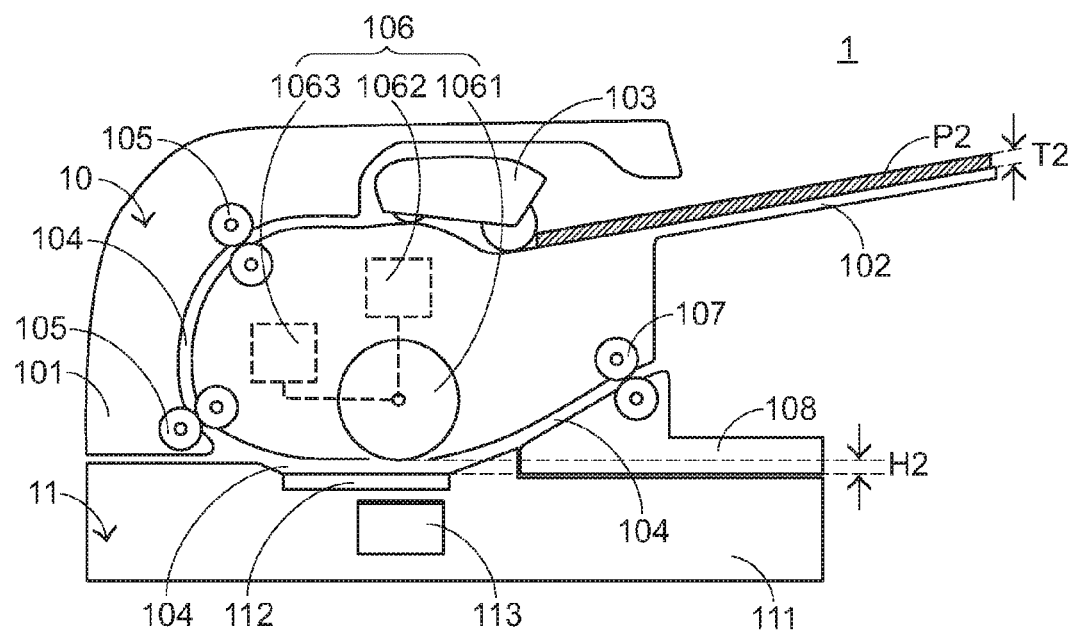
FIG. 2 is a schematic side view illustrating the automatic document feeder of FIG. 1, in which the channel height of the paper feeding channel is changed.

For obviating the drawbacks encountered from the prior art, the present invention provides an automatic document feeder.

Figure 3:
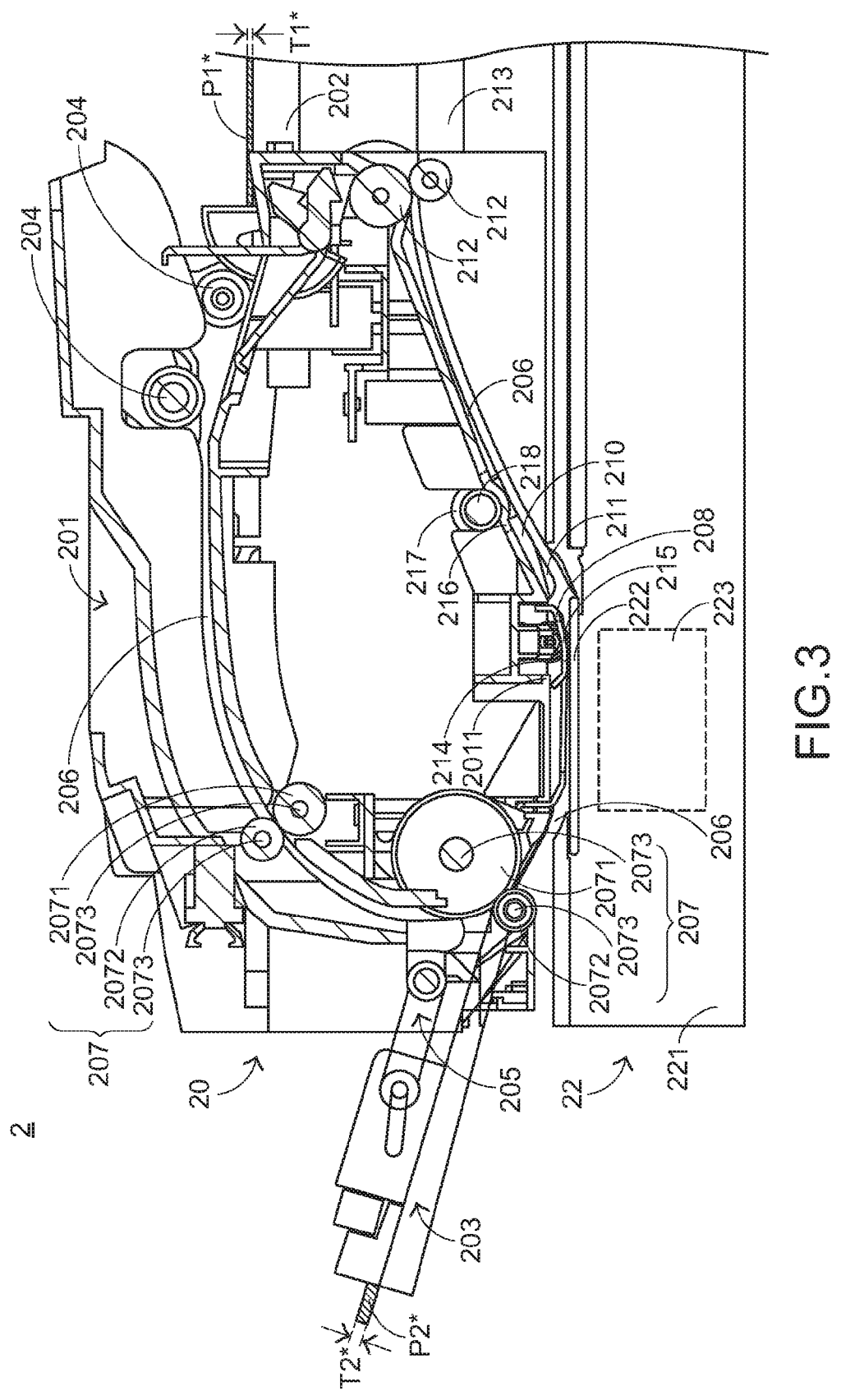

FIG. 3 is a schematic side view illustrating an automatic document feeder according to an embodiment of the present invention. Like the conventional automatic document feeder 10, the automatic document feeder 20 is disposed on a flatbed scanner 22. The automatic document feeder 20 is integrated into the flatbed scanner 22 to collectively define an automatic sheetfed scanning apparatus 2. The automatic document feeder 20 comprises a feeder casing 201, a first input tray 202, a second input tray 203, a first pick-up roller assembly 204, a second pick-up roller assembly 205, a paper feeding channel 206, plural transfer roller assemblies 207, a pressing structure 208, a guiding notch 209 (see FIG. 4), plural first guiding ribs 210, plural second guiding ribs 211, a paper ejecting roller assembly 212, an output tray 213, a driven roller 214, a first perforation 215, a second perforation 216, a transmission roller 217, a transmission shaft 218 and an elastic element 219 (see FIG. 5). The flatbed scanner 22 comprises a scanner casing 221, a scanning platform 222 and a scanning module 223. The configurations and the functions of the flatbed scanner 22 are well known to those in the art, and are not redundantly described herein.

Please refer to FIG. 3 again. A bottom part 2011 of the feeder casing 201 is in contact with the scanning platform 222 of the flatbed scanner 22. The first input tray 202 is disposed on the feeder casing 201 for supporting a first paper P1*. The second input tray 203 is disposed on the feeder casing 201 and arranged at a side of the feeder casing 201 for supporting a second paper P2*. The first paper P1* has a first thickness T1*. The second paper P2* has a second thickness T2*. The second thickness T2* is greater than the first thickness T1*. For example, the first paper P1* is an A4-sized paper with the first thickness T1 of 0.15 mm; and the second paper P2* is a business card with the second thickness T2 of the 0.3 mm. The first pick-up roller assembly 204 is disposed beside the first input tray 202 for feeding the first paper P1* that is supported on the first input tray 202 into the paper feeding channel 206. Similarly, the second pick-up roller assembly 205 is disposed beside the second input tray 203 for feeding the second paper P2* that is supported on the second input tray 203 into the paper feeding channel 206. The paper feeding channel 206 is disposed within the feeder casing 201. The first paper P1* or the second paper P2* may be transported through the paper feeding channel 206.

Please refer to FIG. 3 again. The plural transfer roller assemblies 207 are arranged in the paper feeding channel 206 for transporting the first paper P1* or the second paper P2*. Each of the transfer roller assemblies 207 comprises a transfer driving roller 2071, a transfer driven roller 2072 and two rotating shafts 2073 corresponding to the transfer driving roller 2071 and the transfer driven roller 2072. The transfer driving roller 2071 is driven to rotate. Upon rotation of the transfer driving roller 2071, the first paper P1* or the second paper P2* is moved to rotate the transfer driven roller 2072. The two rotating shafts 2073 are sheathed by the transfer driving roller 2071 and the transfer driven roller 2072, respectively. The paper ejecting roller assembly 212 is used for ejecting the first paper P1* or the second paper P2* to the output tray 213. The first paper P1* or the second paper P2* exited out of the paper feeding channel 206 is supported by the output tray 213.

Figure 4:
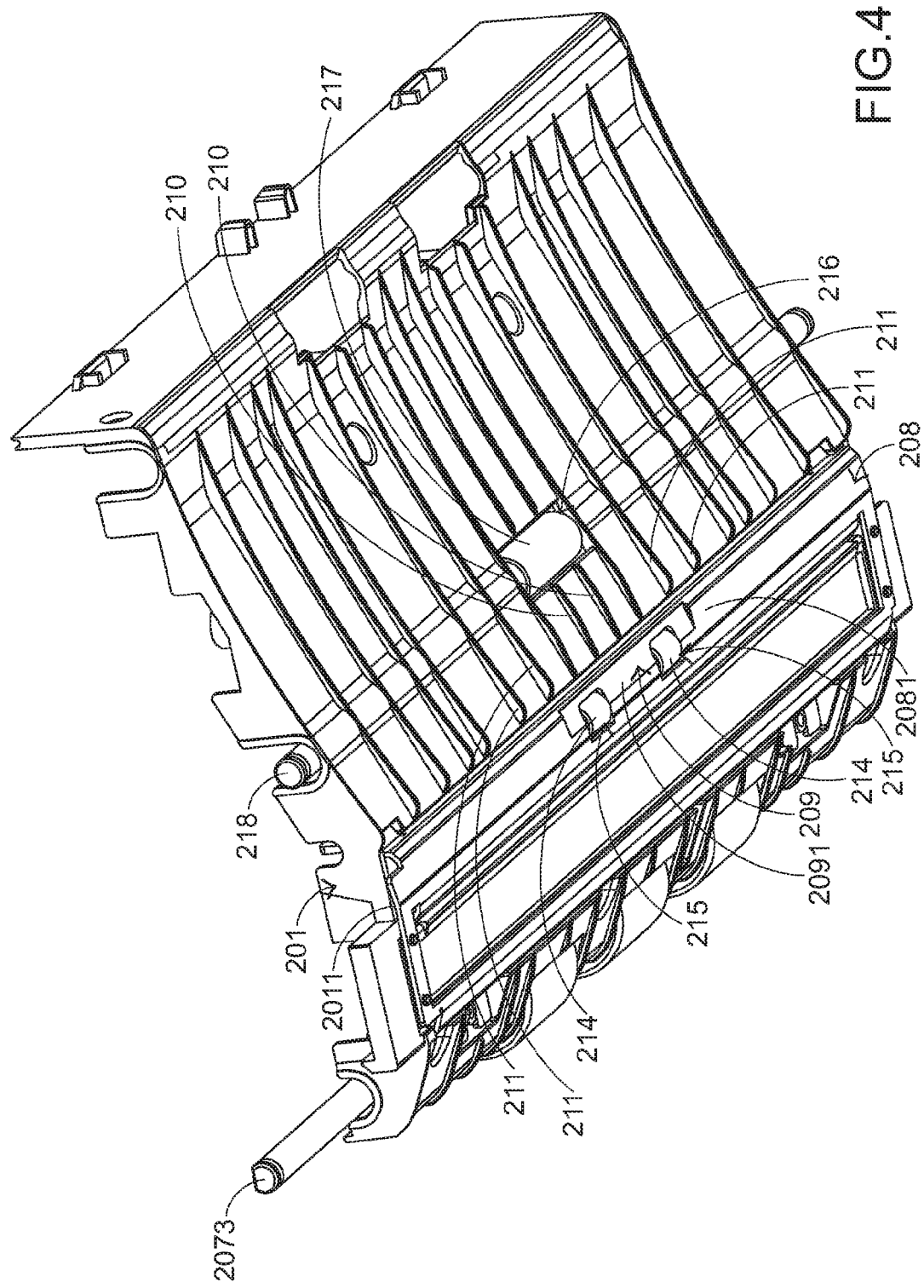
FIG. 4 is a schematic perspective view illustrating the backside of the feeder casing of the automatic document feeder according to the embodiment of the present invention.

FIG. 4 is a schematic perspective view illustrating the backside of the feeder casing of the automatic document feeder according to the embodiment of the present invention. Please refer to FIGS. 3 and 4. The pressing structure 208 is disposed on the bottom part 2011 of the feeder casing 201, i.e. over the scanning platform 222. The pressing structure 208 is used for pressing the first paper P1* or the second paper P2*. In this embodiment, the pressing structure 208 is a paper-pressing slice. The guiding notch 209 is disposed in the pressing structure 208 for guiding the second paper P2* to be moved through the paper feeding channel 206. The guiding notch 209 is defined by a notch bottom surface 2091 and two sidewalls. The distance between the notch bottom surface 2091 and the scanning platform 222 is greater than the distance between a surface 2081 of the pressing structure 208 and the scanning platform 222. In addition, the width of the guiding notch 209 is greater than or equal to the width of the second paper P2*. By means of the guiding notch 209, the second paper P2* can be smoothly transported through the paper feeding channel 206.

The plural first guiding ribs 210 are arranged downstream of the guiding notch 209 for guiding the second paper P2* to be moved through the paper feeding channel 206. Each of the first guiding ribs 210 has a first rib height Hr1. The plural second guiding ribs 211 are arranged beside the first guiding ribs 210 for guiding the first paper P1* to be moved through the paper feeding channel 206. Each of the second guiding ribs 211 has a second rib height Hr2. In this embodiment, as shown in FIG. 4, the second guiding ribs 211 are arranged at bilateral sides of the first guiding ribs 210. In addition, the plural second guiding ribs 211 and the plural first guiding ribs 210 are parallel with each other. The first rib height Hr1 is smaller than the second rib height Hr2. The first perforation 215 is formed in the pressing structure 208 and arranged at a side of the guiding notch 209. The second perforation 216 is arranged downstream of the first guiding ribs 210. The transmission roller 217 is penetrated through the second perforation 216 for transporting the first paper P1* or the second paper P2*. The transmission shaft 218 is sheathed by the transmission roller 217. In addition, the transmission shaft 218 is connected with a power device (not shown). The transmission shaft 218 may be driven by the power device to rotate the transmission roller 217.

Figure 5:
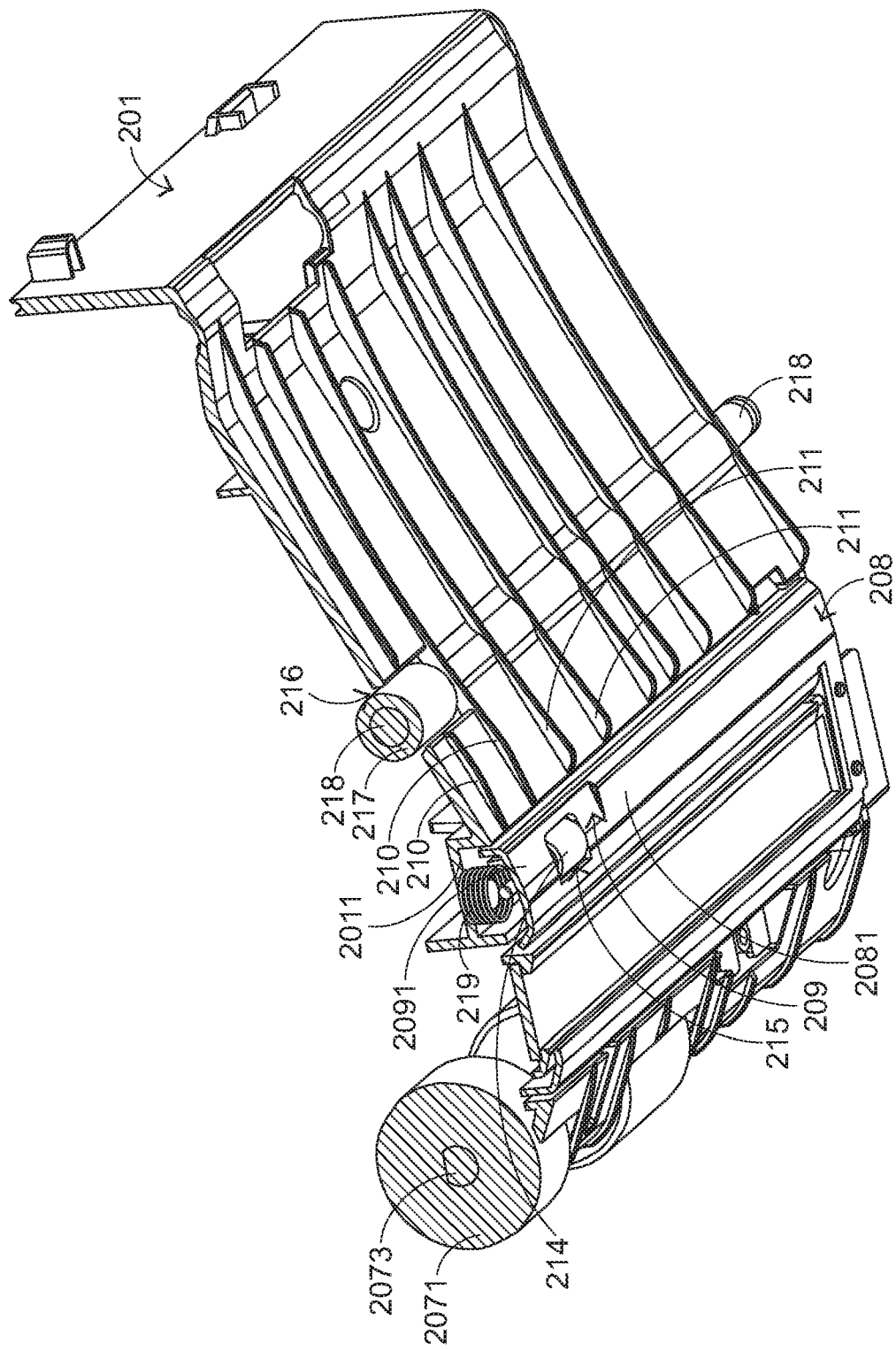
FIG. 5 is a schematic cutaway view illustrating the bottom part of the automatic document feeder according to the embodiment of the present invention.

FIG. 5 is a schematic cutaway view illustrating the bottom part of the automatic document feeder according to the embodiment of the present invention. As shown in FIG. 5, a first terminal of the elastic element 219 is connected with the bottom part 2011 of the feeder casing 201, and a second terminal of the elastic element 219 is connected with the driven roller 214. The elastic element 219 is used for providing an elastic force to the driven roller 214. An example of the elastic element 219 is a spring. On the other hand, the driven roller 214 is installed on the bottom part 2011 of the feeder casing 201 through the elastic element 219. In a case that the driven roller 214 is pressed, the elastic element 219 is compressed and thus the driven roller 214 is received within the first perforation 215. Whereas, in a case that the driven roller 214 is not pressed, the driven roller 214 is penetrated through the first perforation 215 to be exposed outside the pressing structure 208. Meanwhile, the driven roller 214 may assist in transporting the first paper P1* or the second paper P2*.

Figure 6:
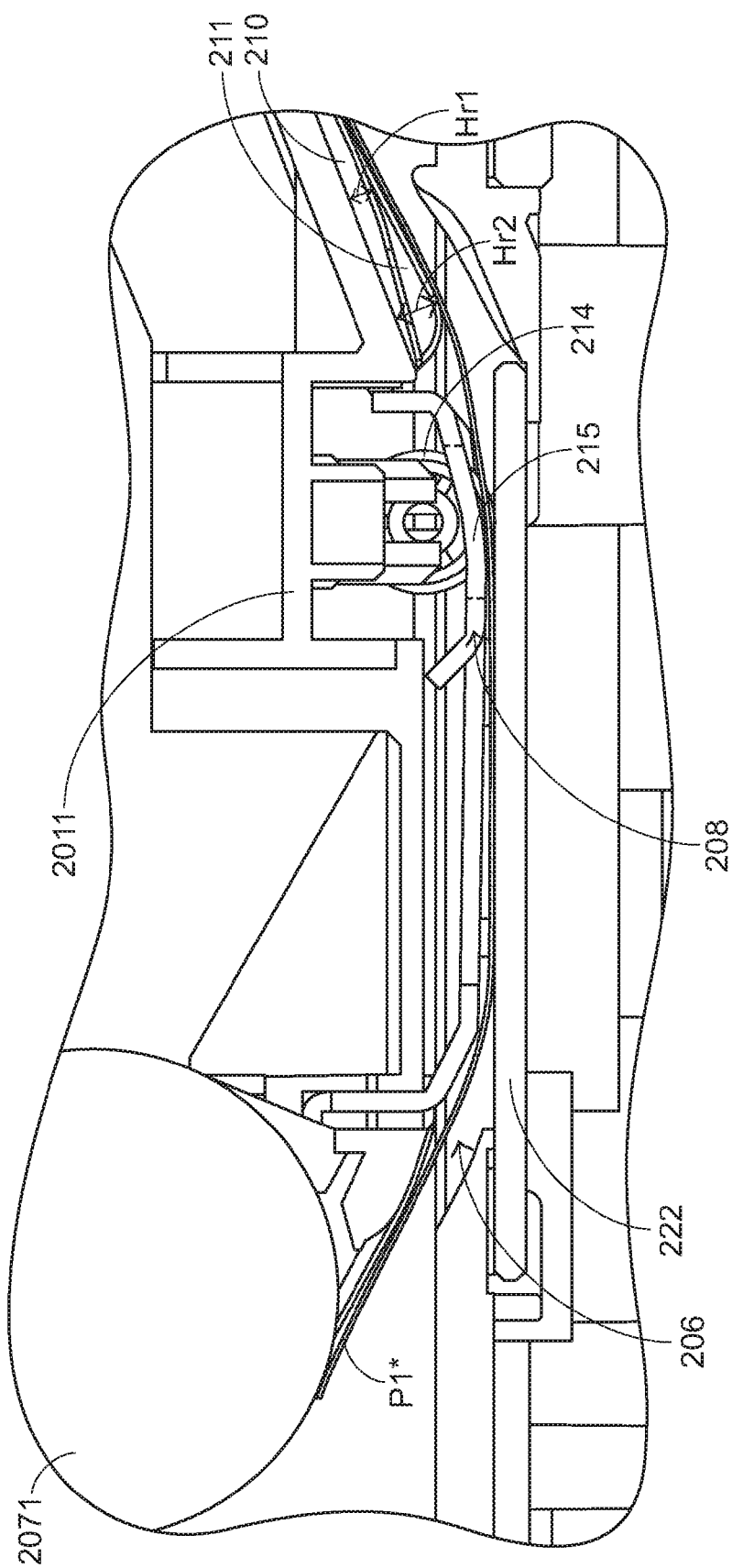
FIG. 6 is a schematic fragmentary side view illustrating a process of transporting the first paper by the automatic document feeder according to the embodiment of the present invention.

Hereinafter, the use of the automatic document feeder 20 to feed the first paper P1* will be illustrated with reference to FIGS. 3 and 6. FIG. 6 is a schematic fragmentary side view illustrating a process of transporting the first paper by the automatic document feeder according to the embodiment of the present invention. Firstly, the first paper P1* supported on the first input tray 202 is fed into the paper feeding channel 206 by the first pick-up roller assembly 204. Then, the first paper P1* is transported by the transfer roller assemblies 207, so that the first paper P1* is moved through the paper feeding channel 206. When the first paper P1* is transported across the paper feeding channel 206 between the scanning platform 222 and the bottom part 2011 of the feeder casing 201 (i.e. the first paper P1* is transported across the bottom part 2011), the first paper P1* is contacted with the driven roller 214 and the surface 2081 of the pressing structure 208. At the same time, the driven roller 214 is rotated by the first paper P1*. The rotation of the driven roller 214 may assist in transporting the first paper P1*. In such way, the first paper P1* can be smoothly transported through the bottom part 2011 of the feeder casing 201 while being scanned by the scanning module 223 of the flatbed scanner 22. As the first paper P1* is continuously moved through the paper feeding channel 206, the first paper P1* is then contacted with the second guiding ribs 211. The first paper P2* is guided by the second guiding ribs 211 to be moved through the paper feeding channel 206. Afterwards, the first paper P1* is transported to the output tray 213 by the transmission roller 217 and the paper ejecting roller assembly 212 successively. Meanwhile, the task of scanning the first paper P1* is completed.

Figure 7:
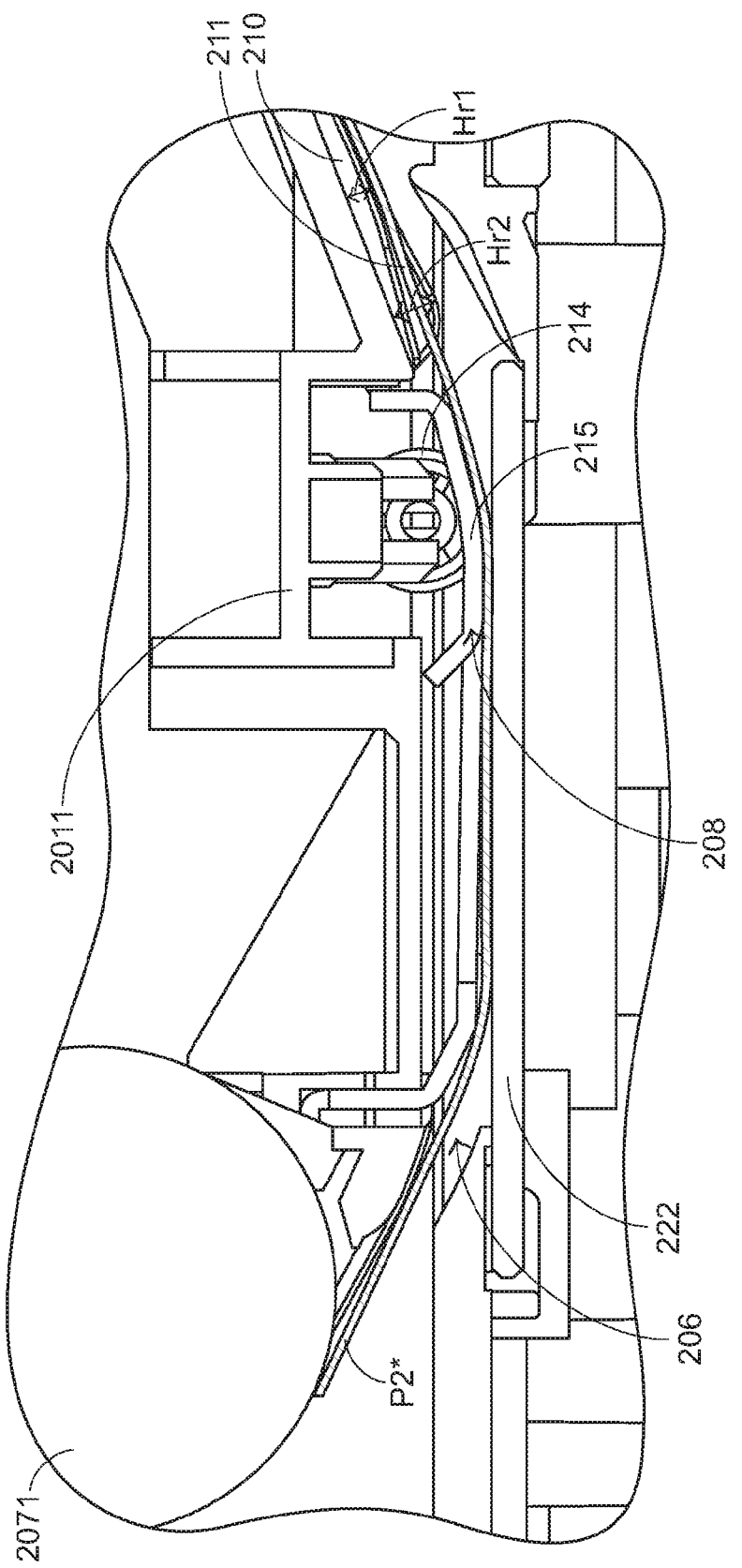
FIG. 7 is a schematic fragmentary side view illustrating a process of transporting the second paper by the automatic document feeder according to the embodiment of the present invention.

Hereinafter, the use of the automatic document feeder 20 to feed the second paper P2* will be illustrated with reference to FIGS. 3 and 7. FIG. 7 is a schematic fragmentary side view illustrating a process of transporting the second paper by the automatic document feeder according to the embodiment of the present invention. Firstly, the second paper P2* supported on the second input tray 203 is fed into the paper feeding channel 206 by the second pick-up roller assembly 205. Then, the second paper P2* is transported by the transfer roller assemblies 207, so that the second paper P2* is moved through the paper feeding channel 206. When the second paper P2* is transported across the paper feeding channel 206 between the scanning platform 222 and the bottom part 2011 of the feeder casing 201 (i.e. the second paper P2* is transported across the bottom part 2011), the second paper P2* is contacted with the driven roller 214 to push the driven roller 214. Consequently, the elastic element 219 is compressed, and the driven roller 214 is received within the first perforation 215. In this situation, the second paper P2* is contacted with the notch bottom surface 2091 of the guiding notch 209. Due to the distance difference between the notch bottom surface 2091 of the guiding notch 209 and the surface 2081 of the pressing structure 208, an additional space is created. The upper portion of the second paper P2* exceeding the first thickness T1* is allowed to be moved through the space between the notch bottom surface 2091 of the guiding notch 209 and the surface 2081 of the pressing structure 208. Under this circumstance, the friction force acting on the thicker second paper P2* is not too large.

At the same time, since the driven roller 214 received within the first perforation 215 is also contacted with the second paper P2*, the driven roller 214 is rotated by the second paper P2*. The rotation of the driven roller 214 may assist in transporting the second paper P2*. In such way, the second paper P2* can be smoothly transported through the bottom part 2011 of the feeder casing 201 while being scanned by the scanning module 223 of the flatbed scanner 22. As the second paper P2* is continuously moved through the paper feeding channel 206, the second paper P2* is moved through the guiding notch 209 and then contacted with the first guiding ribs 210. The second paper P2* is guided by the first guiding ribs 210 to be moved through the paper feeding channel 206. Due to the height difference between the first rib height Hr1 of the first guiding rib 210 and the second rib height Hr2 of the second guiding rib 211, the upper portion of the second paper P2* exceeding the first thickness T1* is allowed to be moved through the paper feeding channel 206 corresponding to the first guiding rib 210. Under this circumstance, the friction force acting on the second paper P2* is not too large. Afterwards, the second paper P2* is transported to the output tray 213 by the transmission roller 217 and the paper ejecting roller assembly 212 successively. Meanwhile, the task of scanning the second paper P2* is completed.

It is noted that, however, numerous modifications and alterations of the connection member may be made while retaining the teachings of the invention. For example, in an automatic document feeder according to a second embodiment of the present invention, the configurations are substantially similar to those of automatic document feeder 20 of the first embodiment except that the driven roller and associated components (e.g. the first perforation and the elastic element) are omitted. Consequently, during the process of transporting the second paper, the second paper is directly contacted with the notch bottom surface of the guiding notch, and moved across the space between the notch bottom surface and the surface of the pressing structure. That is, even if the driven roller is omitted, during the second paper is transported through the paper feeding channel, the friction force acting on the second paper is not too large.

From the above description, the automatic document feeder of the present invention has a pressing structure, which is provided on the bottom part of the feeder casing. In addition, a guiding notch is formed in the pressing structure. Due to the distance difference between the notch bottom surface of the guiding notch and the surface of the pressing structure, an additional space is created. Consequently, the upper portion of the thicker second paper is allowed to be moved through the space. Moreover, plural first guiding ribs are arranged downstream of the guiding notch, and plural second guiding ribs are arranged beside the first guiding ribs, wherein the first rib height of the first guiding rib is smaller than the second rib height of the second guiding rib. Due to the height difference between the first guiding rib and the second guiding rib, the thicker second paper may be guided by the first guiding ribs to be moved through the paper feeding channel. Under this circumstance, during the second paper is transported through the paper feeding channel, the friction force acting on the second paper is not too large.

The automatic document feeder of the present invention is capable of feeding papers with different thicknesses into the paper feeding channel by structurally modifying some components. That is, the channel height of the paper feeding channel is adjustable without the need of installing an additional moving mechanism. Since the moving mechanism is omitted, the overall volume of the automatic document feeder of the present invention will be reduced. Moreover, since it is not necessary to distribute the driving force of the power device to the moving mechanism, the loading of the automatic document feeder will be reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic document feeder disposed on a scanning platform for feeding a first paper or a second paper, a thickness of said first paper is smaller than a thickness of said second paper, said automatic document feeder comprising:
   a feeder casing having a bottom part in contact with said scanning platform;
   a paper feeding channel disposed within said feeder casing and passing through a region between said bottom part of said feeder casing and said scanning platform;
   a pressing structure disposed on said bottom part of said feeder casing for pressing said first paper or said second paper;
   a guiding notch formed in said pressing structure for guiding said second paper to be moved through said paper feeding channel;
   plural first guiding ribs arranged downstream of said guiding notch for guiding said second paper to be moved through said paper feeding channel; and
   plural second guiding ribs arranged beside said plural first guiding ribs for guiding said first paper to be moved through said paper feeding channel, wherein a height of said plural first guiding ribs is smaller than a height of said plural second guiding ribs.

2. The automatic document feeder according to claim 1 further comprising:
   a driven roller disposed on said bottom part of said feeder casing and exposed outside said pressing structure for assisting in transporting said first paper or said second paper; and
   a first perforation formed in said pressing structure and arranged at a side of said guiding notch, wherein said driven roller is penetrated through said first perforation, so that said driven roller is exposed outside said pressing structure.

3. The automatic document feeder according to claim 2 further comprising an elastic element for providing an elastic force to said driven roller, wherein a first terminal of said elastic element is connected with said bottom part of said feeder casing, and a second terminal of said elastic element is connected with said driven roller.

4. The automatic document feeder according to claim 3 wherein said guiding notch further comprises a notch bottom surface, wherein a distance between said notch bottom surface and said scanning platform is greater than a distance between a surface of said pressing structure and said scanning platform, wherein during said first paper is moved through said bottom part of said feeder casing, said first paper is contacted with said driven roller and said surface of said pressing structure, wherein during said second paper is moved through said bottom part of said feeder casing, said second paper is contacted with said notch bottom surface.

5. The automatic document feeder according to claim 2 further comprising:
   a second perforation arranged downstream of said plural first guiding ribs; and
   a transmission roller penetrated through said second perforation for transporting said first paper or said second paper.

6. The automatic document feeder according to claim 5 further comprising a transmission shaft, which is sheathed by said transmission roller for driving rotation of said transmission roller.

7. The automatic document feeder according to claim 1 wherein said guiding notch further comprises a notch bottom surface, wherein a distance between said notch bottom surface and said scanning platform is greater than a distance between a surface of said pressing structure and said scanning platform, wherein during said first paper is moved through said bottom part of said feeder casing, said first paper is contacted with said surface of said pressing structure, wherein during said second paper is moved through said bottom part of said feeder casing, said second paper is contacted with said notch bottom surface.

8. The automatic document feeder according to claim 1 further comprising:
   a first input tray disposed on said feeder casing for supporting said first paper;
   a second input tray disposed on said feeder casing and arranged at a side of said feeder casing for supporting said second paper;
   a first pick-up roller assembly disposed beside said first input tray for feeding said first paper that is supported on said first input tray into said paper feeding channel;
   a second pick-up roller assembly disposed beside said second input tray for feeding said second paper that is supported on said second input tray into said paper feeding channel;
   an output tray disposed under said first input tray for supporting first paper or said second paper that is exited from said paper feeding channel;
   plural transfer roller assemblies disposed in said paper feeding channel for transporting said first paper or said second paper through said paper feeding channel; and
   a paper ejecting roller assembly disposed beside said output tray for transporting said first paper or said second paper to said output tray.

9. The automatic document feeder according to claim 1 wherein said plural second guiding ribs are arranged at bilateral sides of said plural first guiding ribs, and said plural second guiding ribs and said plural first guiding ribs are parallel with each other.

10. The automatic document feeder according to claim 1 wherein said first paper is an A4-sized paper, said second paper is a business card, and the width of said guiding notch is greater than or equal to the width of said second paper.

* * * * *